United States Patent
Wood et al.

(10) Patent No.: US 10,547,589 B2
(45) Date of Patent: Jan. 28, 2020

(54) SYSTEM FOR IMPLEMENTING A SMALL COMPUTER SYSTEMS INTERFACE PROTOCOL OVER A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 15/149,892

(22) Filed: May 9, 2016

(65) Prior Publication Data
US 2017/0324704 A1    Nov. 9, 2017

(51) Int. Cl.
*H04L 29/06* (2006.01)
*H04L 29/12* (2006.01)
*H04L 29/08* (2006.01)

(52) U.S. Cl.
CPC .......... *H04L 61/305* (2013.01); *H04L 63/061* (2013.01); *H04L 63/08* (2013.01);
(Continued)

(58) Field of Classification Search
CPC ... H04L 63/0428; H04L 61/305; H04L 63/08; H04L 63/0876; H04L 63/10; H04L 67/1097; G06F 21/60; G06F 21/602
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| AU | 2005200529 A1 | 3/2005 |
|---|---|---|
| DE | 1720277 A1 | 6/1967 |

(Continued)

OTHER PUBLICATIONS

International Search Report and Written Opinion in counterpart International Application No. PCT/US2017/031121, dated Aug. 11, 2017, 11 pages.
(Continued)

*Primary Examiner* — Jeong S Park

(57) ABSTRACT

One embodiment provides a system that facilitates schematized access control in a content centric network. During operation, the system generates, by a content producing device, a secret key for a user based on a schema, wherein the schema is a regular expression which corresponds to one or more names and allows a user access to content associated with the names, wherein a name is a hierarchically structured variable length identifier that includes contiguous name components ordered from a most general level to a most specific level. The system receives an interest with a name that corresponds to the schema. The system encrypts a payload of a responsive content object based on the interest name. The system transmits the responsive content object with the encrypted payload to the user, which allows the user to decrypt the encrypted payload with the secret key.

20 Claims, 12 Drawing Sheets

(52) U.S. Cl.
CPC ...... *H04L 63/0853* (2013.01); *H04L 63/0869* (2013.01); *H04L 63/10* (2013.01); *H04L 63/123* (2013.01); *H04L 67/1097* (2013.01); H04L 63/0876 (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,071,498 B2 | 6/2015 | Beser |
| 9,112,895 B1 | 8/2015 | Lin |
| 9,253,087 B2 | 2/2016 | Zhang |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |

(56) References Cited

U.S. PATENT DOCUMENTS

| | | |
|---|---|---|
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0221103 A1* | 11/2003 | Hirota ............... G06F 21/10 713/172 |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0257274 A1* | 11/2005 | Shiga ............... G06F 21/31 726/28 |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0235977 A1* | 10/2006 | Wunderlich ........ H04L 67/1097 709/227 |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |

(56) References Cited

U.S. PATENT DOCUMENTS

| | | |
|---|---|---|
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0080559 A1 | 3/2013 | Rao et al. |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |

(56) References Cited

U.S. PATENT DOCUMENTS

| | | |
|---|---|---|
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0173283 A1* | 6/2014 | Hanatani ............ H04L 9/0891 713/171 |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0117253 A1* | 4/2015 | Scott ............... H04L 45/306 370/254 |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222603 A1* | 8/2015 | Uzun ............... H04L 63/0428 713/160 |
| 2015/0254347 A1* | 9/2015 | Mosko ............... H04L 45/742 370/392 |
| 2015/0279348 A1 | 10/2015 | Cao |
| 2015/0312300 A1* | 10/2015 | Mosko ............... H04L 63/164 713/171 |
| 2015/0372903 A1 | 12/2015 | Hui |
| 2015/0381546 A1 | 12/2015 | Mahadevan |
| 2016/0021172 A1 | 1/2016 | Mahadevan |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library—Pairing-Based Cryptography—About," http://crypto.stanford.edu/pbc. downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Anteniese et al., "Improved Proxy Re-Encryption Schemes with Applications to Secure Distributed Storage", 2006.

Xiong et al., "CloudSeal: End-to-End Content Protection in Cloud-based Storage and Delivery Services", 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Shao and Z. Cao. CCA-Secure Proxy Re-Encryption without Pairings. Public Key Cryptography. Springer Lecture Notes in Computer Science vol. 5443 (2009).

Gopal et al. "Integrating content-based Mechanisms with hierarchical File systems", Feb. 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

(56) References Cited

OTHER PUBLICATIONS

RTMP (2009). Available online at http://wwwimages.adobe.com/www.adobe.com/content/dam/Adobe/en/devnet/rtmp/pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.

(56) References Cited

OTHER PUBLICATIONS

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012) . . . .
Hoque et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection

(56) References Cited

OTHER PUBLICATIONS and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56 . . . .
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.

* cited by examiner

SYSTEM FOR IMPLEMENTING A SMALL COMPUTER SYSTEMS INTERFACE PROTOCOL OVER A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338, 175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/927,034, entitled "SYSTEM FOR KEY EXCHANGE IN A CONTENT CENTRIC NETWORK," by inventors Christopher A. Wood, Marc E. Mosko, and Ersin Uzun, filed 29 Oct. 2015 (hereinafter "U.S. patent application Ser. No. 14/927,034"); and the disclosures of which are herein incorporated by reference in their entirety.

BACKGROUND

Field

This disclosure is generally related to distribution of digital content. More specifically, this disclosure is related to a system for implementing a Small Computer Systems Interface (SCSI) protocol over a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

In computer networking, Internet Small Computer Systems Interface (iSCSI) is an Internet Protocol (IP)-based storage networking standard for linking data storage facilities. iSCSI enables two hosts to interface using the SCSI protocol with IP as the transport medium. An end user or application (an "initiator") can send a request, and the operating system can generate the appropriate SCSI command and data request, which go through encapsulation and, if necessary, encryption. A packet header is added before the resulting IP packets are transmitted over an Ethernet connection. The packet is received by another end host or server (a "target"). The target decrypts the packet (if encrypted), and decapsulates or disassembles the packet, extracting the SCSI command and the data request. The target sends the SCSI command to the SCSI controller and/or to the SCSI storage device. Because iSCSI is bi-directional, the protocol can also be used to return data in response to the original request.

While a CCN brings many desired features to a network, some issues remain unsolved for implementing the SCSI protocol over a content centric network.

SUMMARY

One embodiment provides a system that facilitates implementation of the SCSI protocol over a content centric network. During operation, the system receives, by a target device, a first interest which indicates a first nonce and information associated with a first encapsulated protocol data unit, wherein the first unit indicates a first command to be executed by the target device, wherein a name for an interest is a hierarchically structured variable length identifier that includes contiguous name components ordered from a most general level to a most specific level. The system extracts the information associated with the first unit to obtain the first command. The system generates a first content object with a payload that includes data received in response to executing the first command, thereby facilitating the use of a SCSI protocol over a content centric network.

In some embodiments, the first command is a SCSI command and is transmitted to a storage device attached to the target device based on the SCSI protocol.

In some embodiments, the first command indicates a request for the target device to pull data from an initiating device based on a first name, and the information associated with the first unit further indicates the first name. The system generates a second interest with the first name. The system indicates in the second interest information associated with a second encapsulated protocol data unit, wherein the second unit indicates a request for data from the initiating device. In response to the second interest, the system receives a second content object that satisfies the second interest and includes a payload with responsive data.

In some embodiments, the first interest indicates the information associated with the first protocol data unit based on: the first protocol data unit being encapsulated and inserted into a payload of the first interest; or the information associated with the first protocol data unit being encoded in the name of the first interest.

In some embodiments, a routable name prefix of the target device is obtained based on one or more of: a catalog of routable name prefixes of target devices maintained by the initiating device; a manifest published by the target device which lists routable name prefixes for the target device and other target devices under the domain of the target device; and a directory of routable name prefixes for the target device and other target devices, wherein the target device and the other target devices publish their respective routable name prefixes to the directory, which is subsequently obtained and read by an initiating device.

In some embodiments, the system authenticates an initiating device. In response to receiving a third interest with a name that indicates an authentication challenge, an identifier of the initiating device, and a second nonce, the system verifies that the initiating device is permitted to access a storage device operated by and attached to the target device. The system generates a third content object which includes a first random challenge variable in a payload of the third content object. The system receives a fourth interest that indicates a first verification value computed by the initiating device. The system computes a first comparison value based on the identifier of the initiating device, the first random challenge variable, and a secret key of the initiating device. In response to determining that the computed first comparison value matches the first verification value, the system generates a fourth content object that indicates an acknowledgment of the fourth interest, thereby authenticating the initiating device.

In some embodiments, the first verification value is computed by the initiating device based on the identifier of the initiating device, the first random challenge variable, and the secret key of the initiating device. The secret key of the initiating device is previously exchanged with the target device based on a key exchange protocol.

In some embodiments, in response to determining that the computed first comparison value does not match the first verification value, the system generates a negative acknowledgment of the fourth interest.

In some embodiments, the payload of the third content object further includes an identifier of the target device, and a payload of the fourth interest includes a second random challenge variable generated by the initiating device. The system authenticates the target device. The system computes a second verification value based on the identifier of the target device, the second random challenge variable, and a secret key of the target device. The system includes the second verification value in a payload of the fourth content object. In response to the initiating device successfully verifying the second verification value, the system receives an acknowledgment of the fourth content object. In response to the initiating device unsuccessfully verifying the second verification value, the system receives a negative acknowledgment of the fourth content object.

In some embodiments, the target device and the initiating device establish a security association based on one or more of: a key exchange protocol; a key exchange protocol based on a content centric network; and a Diffie-Hellman key exchange protocol, wherein information needed for a key exchange protocol is included in a payload of an interest or a content object sent or received by the target device.

Another embodiment provides a system that facilitates implementation of the SCSI protocol over a content centric network. During operation, the system generates, by an initiating device, a first interest which indicates a first nonce and information associated with a first encapsulated protocol data unit, wherein the first unit indicates a first command to be executed by a target device, wherein a name for an interest is a hierarchically structured variable length identifier that includes contiguous name components ordered from a most general level to a most specific level. In response to the first interest, the system receives first content object with a payload that includes data received in response to the target device executing the first command, thereby facilitating the use of a SCSI protocol over a content centric network.

In some embodiments, the first command indicates a request for the target device to pull data from the initiating device based on a first name, and the information associated with the first unit further indicates the first name. The system receives a second interest with the first name, wherein the second interest indicates information associated with a second encapsulated protocol data unit, wherein the second unit indicates a request for data from the initiating device. The system generates a second content object that satisfies the second interest and includes a payload with responsive data.

In some embodiments, the first interest indicates the information associated with the first protocol data unit based on: encapsulating and inserting the first protocol data unit into a payload of the first interest; or encoding the information associated with the first protocol data unit in the name of the first interest.

In some embodiments, the system obtains a routable name prefix of the target device based on one or more of: maintaining a catalog of routable name prefixes of target devices; a manifest published by the target device which lists routable name prefixes for the target device and other target devices under the domain of the target device; and a directory of routable name prefixes for the target device and other target devices, wherein the target device and the other target devices publish their respective routable name prefixes to the directory, wherein the initiating device obtains the routable name prefix from the directory.

In some embodiments, the system authenticates the initiating device to the target device. The system generates a third interest with a name that indicates an authentication challenge, an identifier of the initiating device, and a second nonce. In response to the target device verifying that the initiating device is permitted to access a storage device operated by and attached to the target device, the system receives a third content object which includes a first random challenge variable in a payload of the third content object. The system computes a first verification value based on the identifier of the initiating device, the first random challenge variable, and a secret key of the initiating device. The system generates a fourth interest that indicates the first verification value. In response to the target device successfully verifying the first verification value, the system receives a fourth content object that indicates an acknowledgment of the fourth interest, thereby authenticating the initiating device.

In some embodiments, in response to the target device unsuccessfully verifying the first verification value, the system receives a negative acknowledgment of the fourth interest.

In some embodiments, the payload of the third content object further includes an identifier of the target device, and a payload of the fourth interest includes a second random challenge variable generated by the initiating device. The system authenticates the target device. The system computes, by the target device, a second verification value based on the identifier of the target device, the second random challenge variable, and a secret key of the target device, wherein the second value is included in a payload of the fourth content object. The system computes, by the initiating device, a second comparison value based on the identifier of the target device, the second random challenge variable, and the secret key of the target device. In response to determining that the computed second comparison value matches the second verification value, the system generates an acknowledgment of the fourth content object. In response to determining that the computed second comparison value does not match the second verification value, the system generates a negative acknowledgment of the fourth content object.

BRIEF DESCRIPTION OF THE FIGURES

In the figures, like reference numerals refer to the same figure elements.

DETAILED DESCRIPTION

Figure 1A:
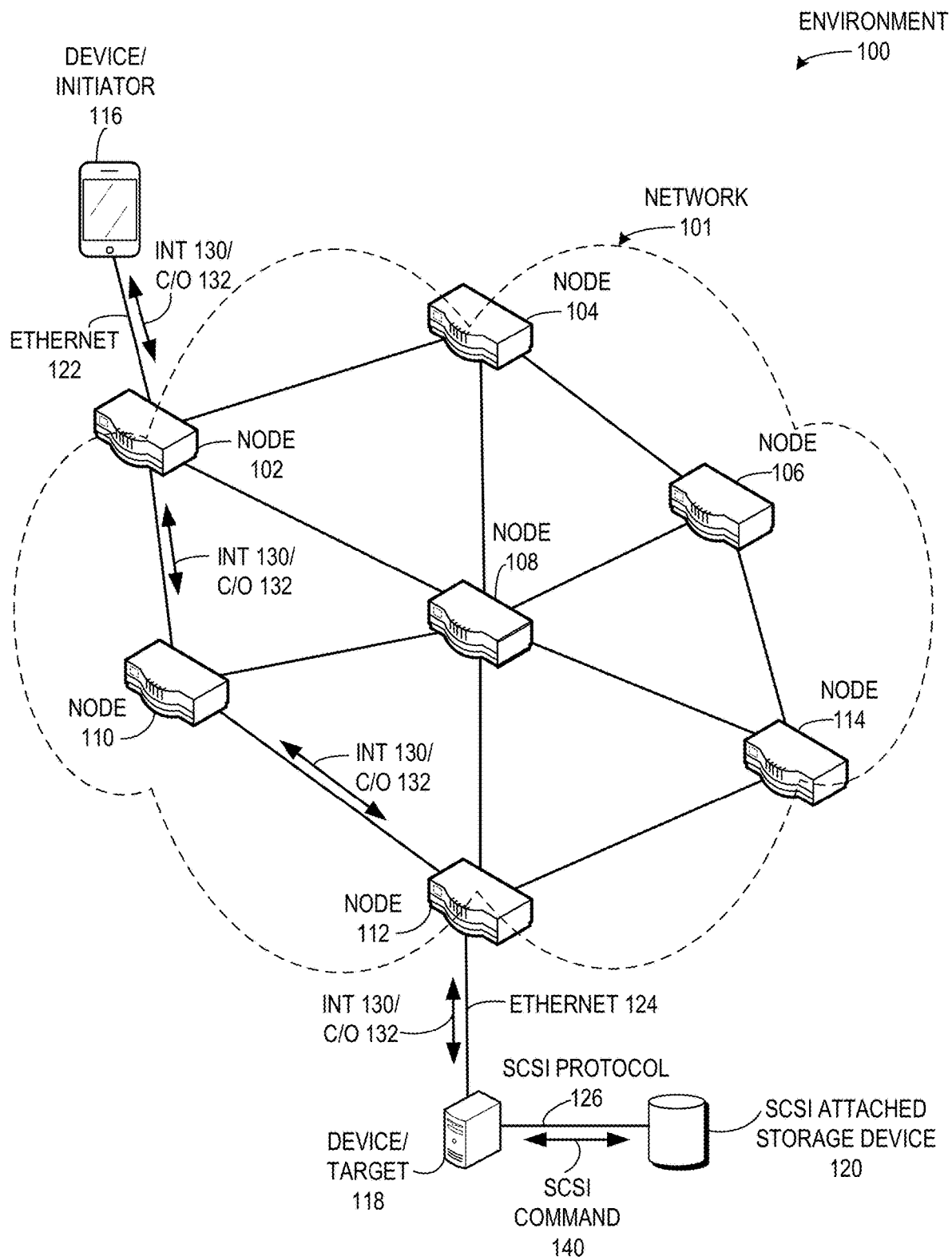
FIG. 1A illustrates an exemplary environment which facilitates the implementation of the SCSI protocol over a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that facilitates the implementation of the SCSI protocol over a content centric network, by encapsulating PDUs in interest payloads or by encoding interest names with PDU data. In a current implementation of the SCSI protocol over the Internet (i.e., iSCSI), an iSCSI "initiator" requests data to be read or written to a storage attached to or operated by an iSCSI "target." The iSCSI initiator converts the SCSI commands to iSCSI commands (e.g., encapsulates the SCSI commands in an IP packet), which are then sent to an IP Storage Area Network. Upon receiving the IP packet with the encapsulated SCSI commands, the target disassembles (e.g., decapsulates) the packet, and issues the SCSI commands to the storage.

In embodiments of the present invention, the system facilitates the implementation of the SCSI protocol over a CCN. In CCN, a device can be identified by its routable name prefix, and all interest-based communication relies on the routable name prefix to ensure that an interest will reach the intended target device (or "target"). Thus, an initiating device (or "initiator) must discover the routable name prefix of the target. The initiator can obtain the routable name prefix of the device by maintaining a catalog of routable name prefixes of target devices. In addition, the target device may publish a manifest which lists routable name prefixes for the target device and other target devices under the domain of the target device. Furthermore, the target device (and other target devices) can publish its routable name prefix to a directory, and the initiator may obtain the routable name prefixes for a respective target from the directory.

After determining the routable name prefix for the target, the initiator and the target can establish a session based on an authentication process and negotiation of a security association. The initiator can authenticate itself to the target (as described below in relation to FIG. 2A), and the target can authenticate itself to the initiator (as described below in relation to FIG. 2B), by exchanging authentication messages. In addition, during the authentication process, the initiator and the target can establish a security association similar to IPSec so that future data or commands sent between the initiator and the target may be encrypted and authenticated. The negotiation of the security association may be mixed with the authentication protocol using, e.g., a standard Diffie-Hellman (DH) key exchange. Specifically, the initiator and the target can exchange DH pairs derived from an agreed-upon set of DH group parameters during the exchange of the authentication messages. Each DH pair is authenticated using information specific to the initiator or the target. For example, the DH pair of the initiator can be authenticated using a symmetric key message authentication code (MAC), where the target is the only party with the corresponding verification key, or with a public-key digital signature. This information may be included in the payload of an interest or content object, e.g., during the exchange of the authentication messages. After each host is authenticated (using shared secrets or a PKI-based technique), the shared DH secret can be used to derive a symmetric key, which can be used to encrypt subsequent interests and content objects. An example of a key exchange protocol for CCN is described in U.S. patent application Ser. No. 14/927,034.

After the session and the security association are established, the initiator and the target may begin exchanging SCSI commands. SCSI commands and responses (i.e., protocol data units or PDUs) may be transferred in interests by encapsulating a PDU and inserting the encapsulated PDU into an interest payload, or by encoding the PDU data in the name of an interest. Furthermore, all PDU data, including the command information (i.e., the Command Descriptor Block) and response (e.g., the data) can be encrypted based on an authenticated encryption protocol, such as AES-GCM, using the symmetric key previously agreed upon during the negotiation of the security association.

In embodiments of the present invention, the participating devices can encapsulate the full range of SCSI commands, including: SCSI and task management function requests and responses (encoded in interests and content objects, respectively); SCSI data in and out commands (encoded in chunked interests and content objects, respectively); SCSI request to transfer (R2T) (encoded in an interest and a content object, but initiated from the target, where the R2T name prefix is established or agreed upon during the session negotiation stage of the protocol); and SCSI text, login, logout, and no-op (heartbeat) request and response (encoded in interests and content objects, respectively).

Thus, embodiments of the present invention allow an initiating device to discover a target device, establish a session via an authentication process, negotiate security parameters, and exchange SCSI commands over a content centric network. Hence, embodiments of the present invention result in increased efficiency in a network, specifically, in the communications or exchange of SCSI commands and data between an initiating device and a target device.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847, 814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates the implementation of the SCSI protocol over a content centric network, in accordance with an embodiment of the present invention. Environment 100 can include a consumer, client, or content requesting device 116 (e.g., an initiating device or initiator), a network 101 which can be a content centric network, and a producer or content producing device 118 (e.g., a target device or target). Network 101 can include a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Initiator 116 and target 118 can communicate with network 101 based on Ethernet protocols 122 and 124, respectively. Target 118 can be attached to or have access to a SCSI attached storage device 120. Target 118 can communicate with device 120 based on a SCSI protocol 126.

Initiator 116 can authenticate itself to target 116, as described below in relation to FIG. 2A, via two data exchanges between initiator 116 and target 118. For example, in the first data exchange, initiator 116 can send an interest 130 and receive a responsive content object 132. The second data exchange can include data packets that travel on the same path as interest 130 and content object 132. Note that target 118 can also authenticate itself to initiator 116. This can occur in the same two data exchanges described above, with one additional data packet sent to target 118, as described below in relation to FIG. 2B.

Figure 1B:
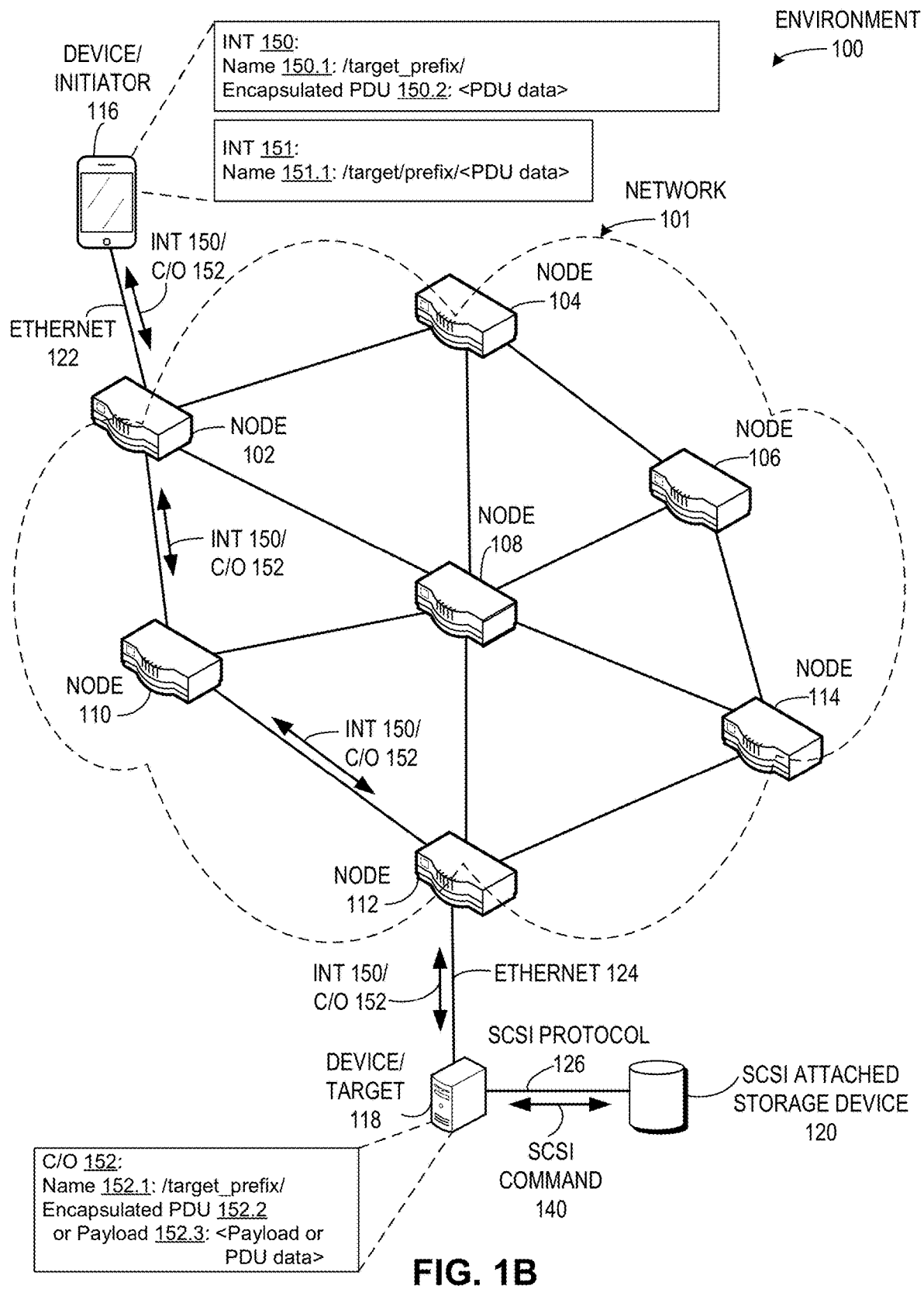
FIG. 1B illustrates an exemplary environment which facilitates the implementation of the SCSI protocol over a content centric network, in accordance with an embodiment of the present invention.

FIG. 1B illustrates exemplary environment 100 which facilitates the implementation of the SCSI protocol over a content centric network, in accordance with an embodiment of the present invention. After initiator 116 and target 118 have authenticated each other, as described in relation to FIGS. 2A and 2B, they may begin exchanging SCSI commands and data. During operation, initiator 116 can generate an interest which indicates information associated with a first encapsulated protocol data unit (PDU). For example, initiator 116 can indicate the information by generating an interest 150 with a name 150.1 of "/target/prefix" and an encapsulated PDU 150.2 of "<PDU data>." Alternatively, initiator 116 can indicate the information by encoding the PDU data in the interest name. For example, initiator 116 can generate an interest 151 with a name 151.1 of "/target/ prefix/<PDU data>." Interest 150 (or 151) can travel through network 101 via nodes 102, 110 and 112, before reaching target 118. Upon receiving interest 150 (or 151), target 118 can obtain or extract the PDU data by, e.g., decapsulating encapsulated PDU 150.2 of interest 150 (or decoding the PDU data in name 151.1 of interest 151). The PDU data can include a SCSI command 140. Target 118 can transmit SCSI command 140 via SCSI protocol 126 to storage device 120. In response to receiving data from device 120, target 118 can generate a content object 152 with a name 152.1 of "/target/prefix" (or, in response to interest 151, with a name 151.1 of "/target/prefix/<PDU data>"), and an encapsulated PDU 152.2 or a payload 152.3 of "<Payload or PDU data>." Target 118 can send content object 152 to initiator 116 on a reverse path (e.g., via nodes 112, 110, and 102). Upon receiving content object 152, initiator 116 can obtain or extract the PDU data by, e.g., decapsulating encapsulated PDU 152.2 (or reading payload data 152.3). Exemplary communications between an initiator and a target are described below in relation to FIGS. 3 and 4.

Thus, embodiments of the present invention provide a system that implements the SCSI protocol over a content centric network. This results in a more efficient network for access to and distribution of data over a network.

Exemplary Authentication Between a Client Device and a Producer

Figure 2A:
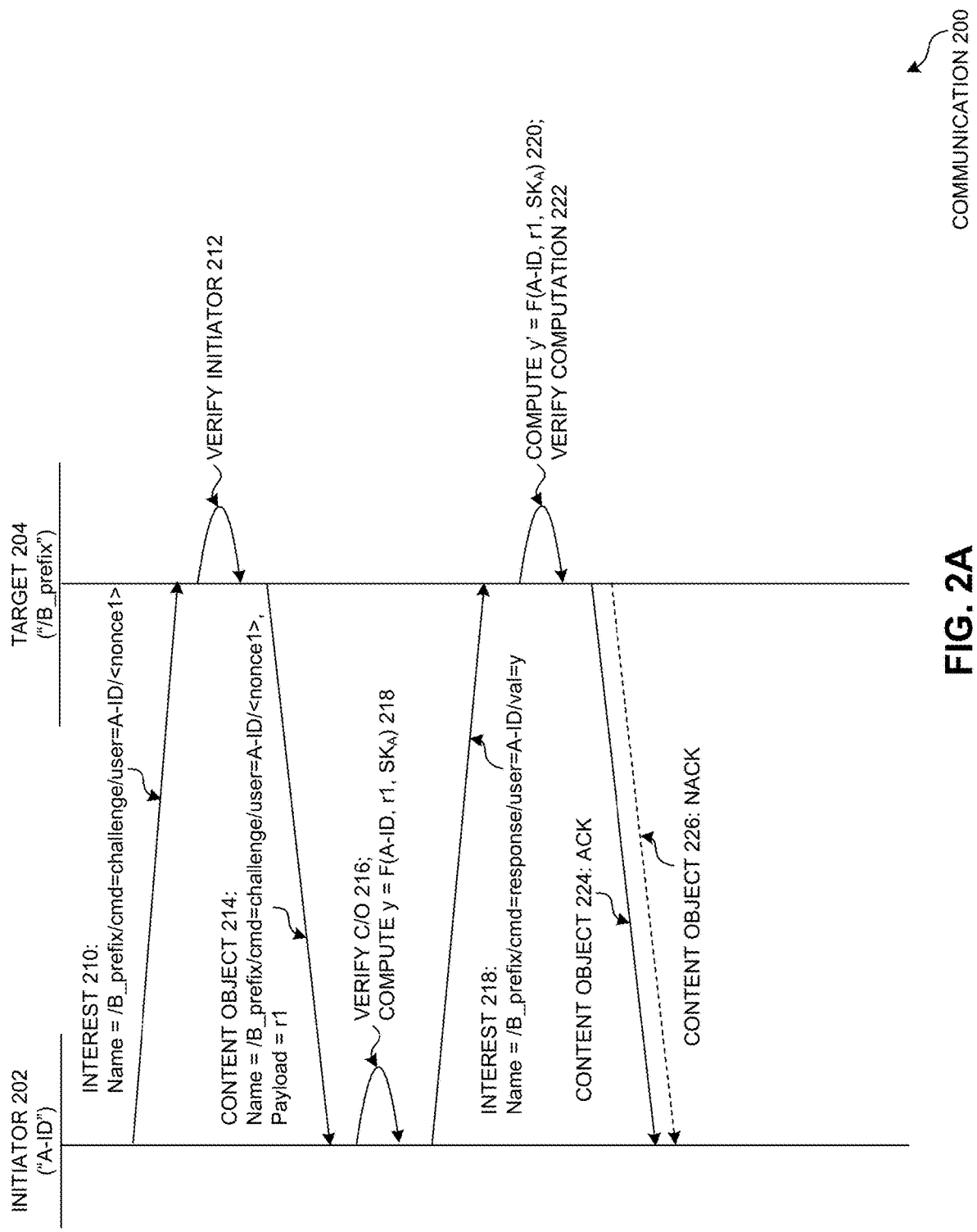
FIG. 2A illustrates an exemplary communication which facilitates the implementation of the SCSI protocol over a content centric network, including authentication of an initiator, in accordance with an embodiment of the present invention.

FIG. 2A illustrates an exemplary communication 200 which facilitates the implementation of the SCSI protocol over a content centric network, including authentication of an initiator, in accordance with an embodiment of the present invention. An initiator 202 can have an identifier of "A-ID," and a target 204 can have a routable name prefix of "/B_prefix." Target 204 can operate a storage device or medium (not shown) via the SCSI protocol. Initiator 202 can generate an interest 210 with a name that includes the routable prefix of target 204, a command which indicates an authentication challenge, the identifier of initiator 202, and a random nonce used to ensure that the interest does not hit a cache, such as: "/B_prefix/cmd=challenge/user=A-ID/<nonce1>." Upon receiving interest 210, target 204 can verify that initiator 202 is allowed or permitted to access the storage device or medium operated by target 204 (function 212). Target 204 can compute a first random challenge variable, "r1", and return a content object 214 with the first challenge variable r1 in the payload of content object 214.

Upon receiving content object 214, initiator 202 can verify content object 214 (function 216), and compute a first verification value based on the identifier of initiator 202, the first challenge variable, and a secret key of initiator 202 ("$SK_A$") (function 218), yielding "y." Initiator 202 can generate an interest 218 with a name that includes the first verification value y, such as: "/B_prefix/cmd=response/user=A-ID/val=y." In some embodiments, initiator 202 can append a random nonce (e.g., "<nonce2>").

Upon receiving interest 218, target 204 can compute a first comparison value based on the identifier of initiator 202, the first challenge variable r1, and the secret key $SK_A$ of initiator 202 (function 220), yielding "y'." Note that the secret key $SK_A$ of the initiator is previously exchanged with the target device based on a key exchange protocol. Target 204 can verify the computed first comparison value y' by determining whether the first comparison value y' matches the first verification value y (function 222). If it does, target 204 can generate a content object 224 that indicates an acknowledgment ("ACK") of interest 218, thus successfully authenticating initiator 202 to target 204. If y' does not match y, target 204 can generate a content object 226 that indicates a negative ACK ("NACK") of interest 218 (shown by the dashed line), which indicates an unsuccessful authentication of initiator 202 to target 204.

Figure 2B:
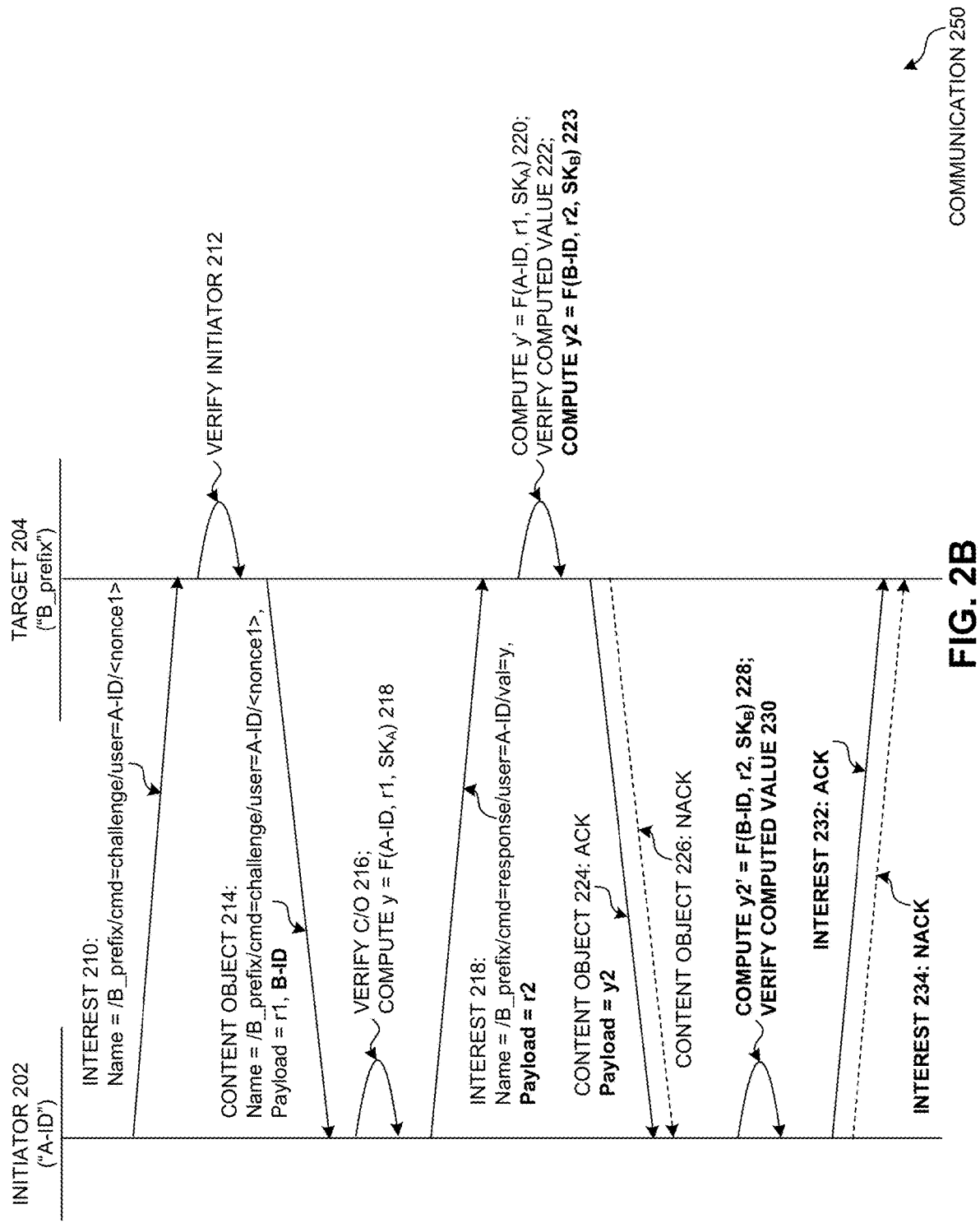
FIG. 2B illustrates an exemplary communication which facilitates the implementation of the SCSI protocol over a content centric network, including authentication of a target, in accordance with an embodiment of the present invention.

Communication 200 can be extended to authenticate target 204 to initiator 202. FIG. 2B illustrates an exemplary communication 250 which facilitates the implementation of the SCSI protocol over a content centric network, including authentication of a target, in accordance with an embodiment of the present invention. Communication 250 corresponds to communication 200, with the differences shown in bold. In addition to including the first challenge variable r1 in the payload of content object 214, target 204 can also include in the payload of content object 214 the identifier of target 204 (e.g., "B-ID"). Initiator 202 can also compute and include a second random challenge variable "r2" in the payload of interest 218. If target 204 successfully verifies initiator 202 (i.e., y' matches y, and target 204 sends an ACK in content object 224), target 204 can include a similarly computed second verification value based on the identifier of target 204, the second challenge variable r2, and a secret key of target 204 ("$SK_B$") (function 223), which yields "y2." Target 204 can include y2 in the payload of content object 224.

Subsequently, upon receiving content object 224, initiator 202 can compute a second comparison value based on the identifier of target 204, the second challenge variable r2, and the secret key $SK_B$ of target 202 (function 228), yielding "y2'." Note that the secret key $SK_B$ of the target is previously exchanged with the initiator based on a key exchange protocol. Initiator 202 can then verify the computed second comparison value y2 ' by determining whether the second comparison value y 2' matches the second verification value y2 (function 230). If it does, initiator 202 can generate an interest 232 that indicates an ACK of content object 224, thus successfully authenticating target 204 to initiator 202. If y2' does not match y2, initiator 202 can generate an interest 234 that indicates a NACK of content object 224 (shown by the dashed line), which indicates an unsuccessful authentication of target 204 to initiator 202.

Exemplary Communication Via SCSI Between an Initiator and a Target

After the session and the security association are established, the initiator and the target may begin exchanging SCSI commands. Some SCSI commands are simple queries which provide a form of an ACK response, while other SCSI commands send or push data from the initiator to the target. The data may be inserted in the payload of an interest message, as described below in relation to FIG. 3. An initiator may also request for a target to pull data from the initiator, by issuing a command (such as a "write" command) and providing the name of a subsequent interest that the target can use to request the data for the command, as described below in relation to FIG. 4

Figure 3:
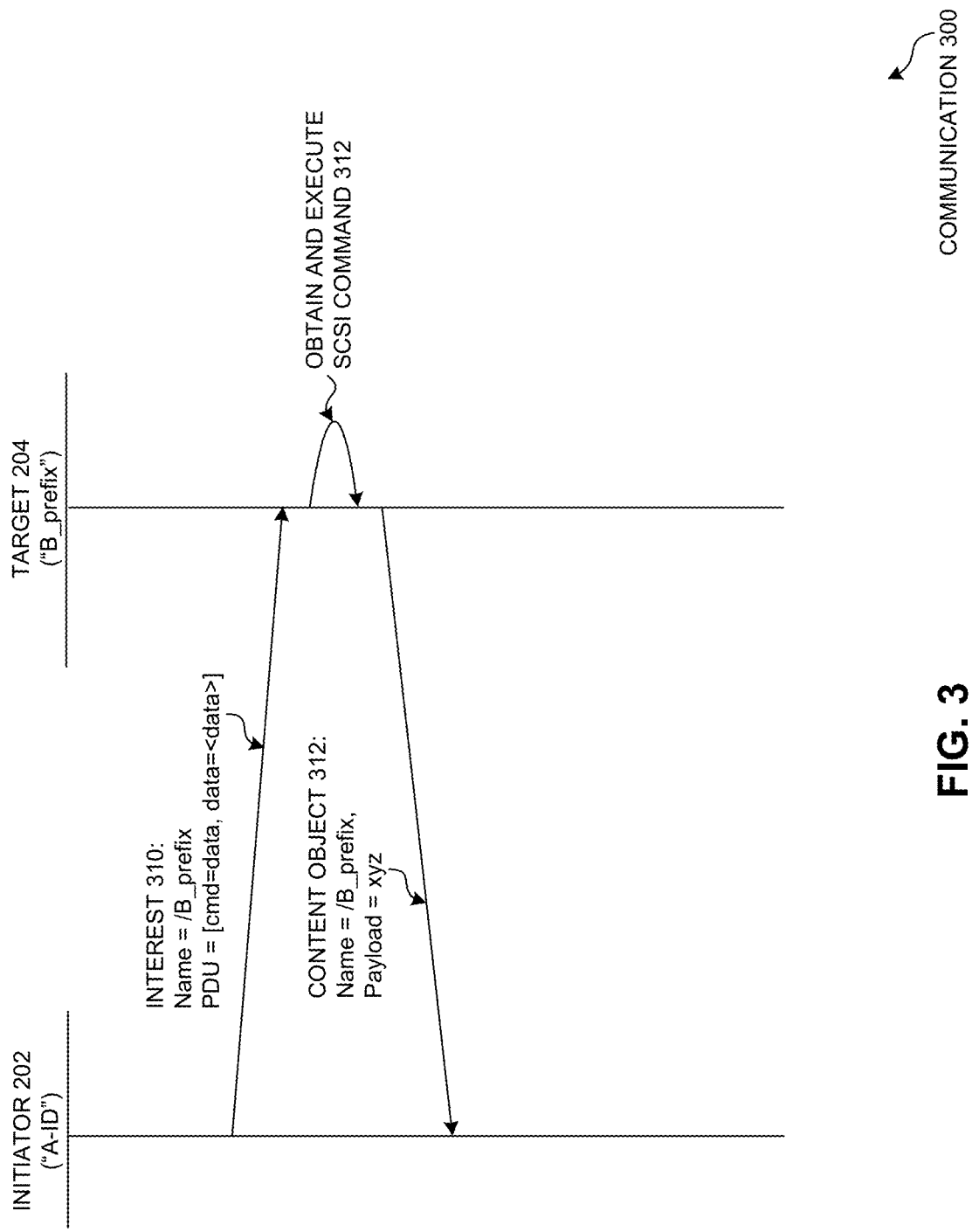
FIG. 3 illustrates an exemplary communication which facilitates the implementation of the SCSI protocol over a content centric network, including a SCSI command that provides an ACK response, in accordance with an embodiment of the present invention.

FIG. 3 illustrates an exemplary communication 300 which facilitates the implementation of the SCSI protocol over a content centric network, including a SCSI command that provides an ACK response, in accordance with an embodiment of the present invention. During operation, initiator 202 can generate an interest 310 with a name of "B_prefix" and an encapsulated PDU which indicates a command to, e.g., write data ("cmd=data"), and the data to be written ("data=<data>"). Target 204 can extract or obtain the SCSI command and the corresponding data from the encapsulated PDU, and execute the SCSI command by sending the data to the appropriate storage device (function 312), as described in relation to SCSI command 140 of FIG. 1B. Subsequently, target 204 can generate a content object 314 with a name of "/B_prefix" and a payload of "xyz," which can indicate an ACK or additional information. In some embodiments, target 204 can extract or obtain the SCSI command and the corresponding data from the encoded name of a received interest, as described in relation to interest 151 of FIG. 1B.

Figure 4:
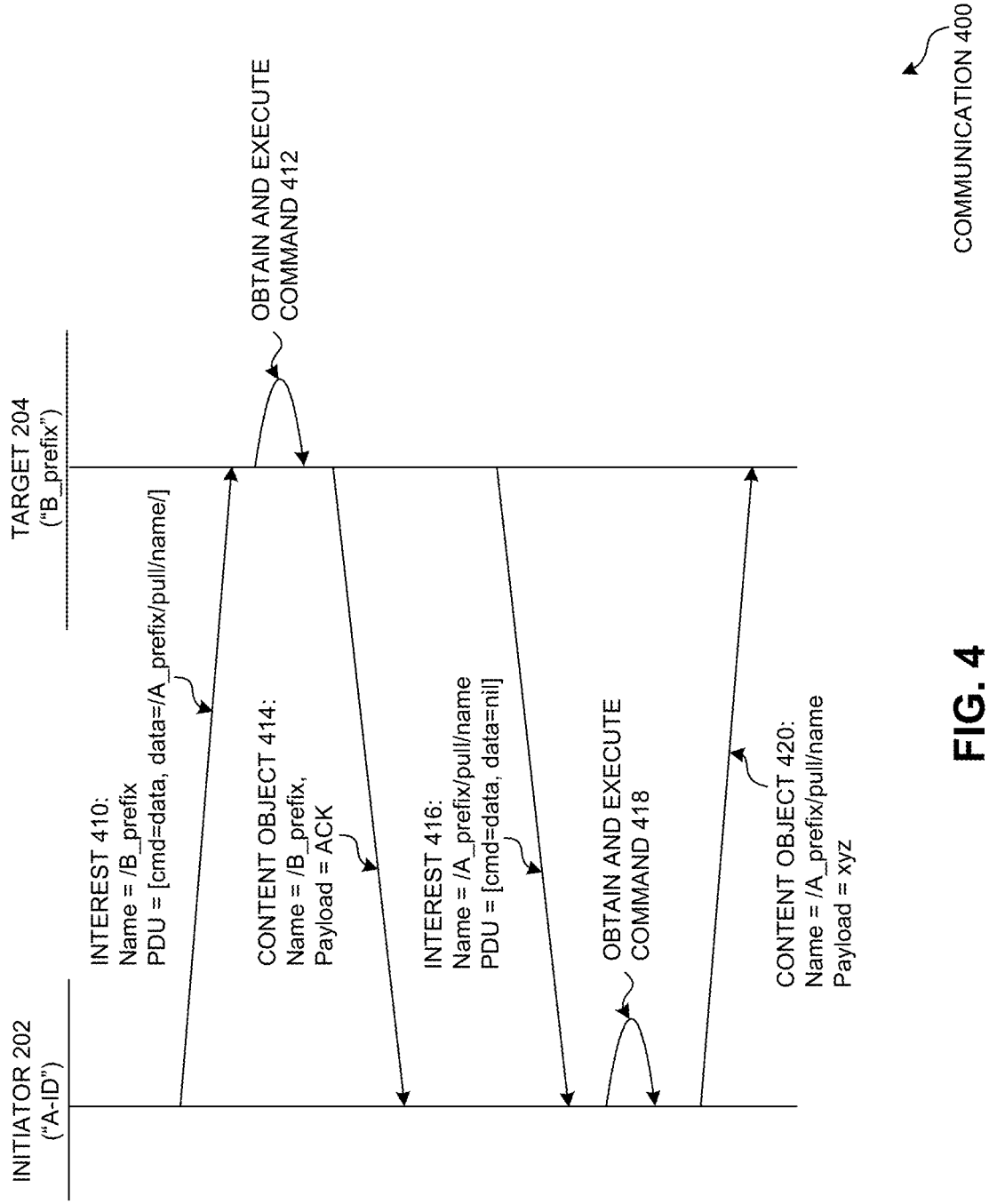
FIG. 4 illustrates an exemplary communication which facilitates the implementation of the SCSI protocol over a content centric network, including a SCSI command that is a request from the target to pull data from the initiator, in accordance with an embodiment of the present invention.

FIG. 4 illustrates an exemplary communication 400 which facilitates the implementation of the SCSI protocol over a content centric network, including a SCSI command that is a request from the target to pull data from the initiator, in accordance with an embodiment of the present invention. During operation, initiator 202 can generate an interest 410 with a name of "/B_Prefix" and an encapsulated PDU which indicates a command to, e.g., write data ("cmd=data"), and the interest name that the target can use to request the data for the command ("data=/A_prefix/pull/name"). Upon receiving interest 410 and verifying initiator 202, target 204 can extract or decapsulate the PDU of interest 410 (e.g., by obtaining and executing the command) (function 412)). Target 204 can return a content object 414 with a name of "/B_prefix" and a payload that indicates an ACK. Target 204 can also generate an interest 416 with a name that is the interest name provided in the decapsulated or extracted PDU of interest 410: "/A_prefix/pull/name." Interest 416 can include an encapsulated PDU which indicates a command to, e.g., read data ("cmd=data"), and a data field with a no value ("data=nil"). Upon receiving interest 416, initiator 202 can obtain and execute the SCSI command (function 418). Initiator 202 can return a content object 420 with a name of "/A_prefix/pull/name" and a payload with the data (e.g., "xyz") that target 204 can write to the appropriate SCSI storage device operated by target 204. Note that content object 414, which indicates the ACK of interest 410, may be transmitted to initiator 202 any time after interest 410 is received and verified by target 204. For example, target 204 may transmit content object 414 to initiator 202 after transmitting interest 416 or after receiving content object 420.

Initiating Device Facilitates SCSI Over CCN

Figure 5A:
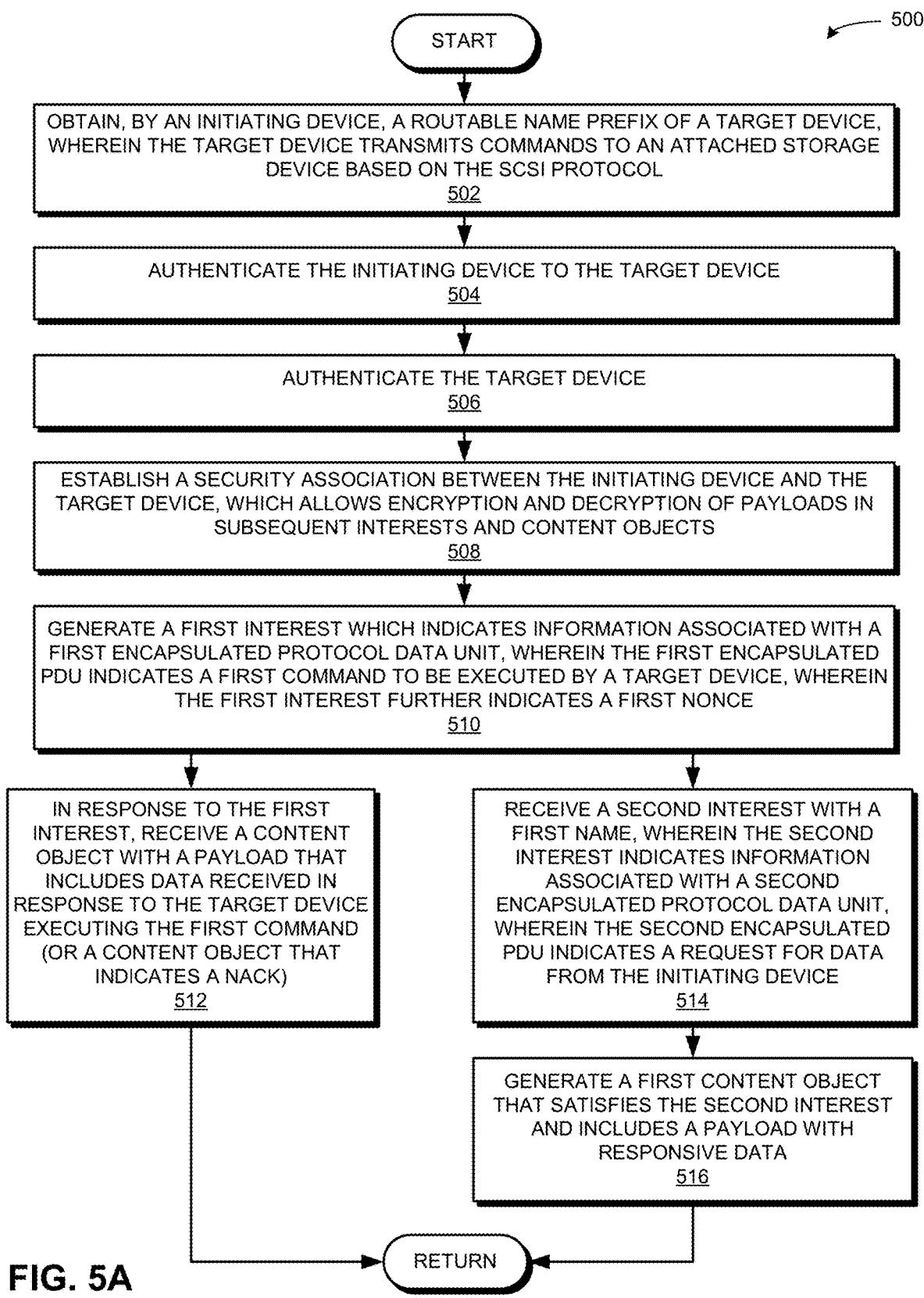
FIG. 5A presents a flow chart illustrating a method by an initiator or a client computing device for facilitating the implementation of the SCSI protocol over a content centric network, in accordance with an embodiment of the present invention.

FIG. 5A presents a flow chart illustrating a method 500 by an initiator or a client computing device for facilitating the implementation of the SCSI protocol over a content centric network, in accordance with an embodiment of the present invention. During operation, the system obtains, by an initiating device or an initiator, a routable name prefix of a target device, wherein the target device transmits commands to an attached storage device based on the SCSI protocol (operation 502). The system authenticates the initiating device to the target device (operation 504, as described in relation to FIG. 2A). The system also authenticates the target device (operation 506, as described in relation to FIGS. 2B and 5B). The system establishes a security association between the initiating device and the target device, which allows encryption and decryption of payloads in subsequent interests and content objects (operation 508). The system generates a first interest which indicates information associated with a first encapsulated protocol data unit (PDU) (operation 510). The first encapsulated PDU indicates a first command to be executed by the target device, and the first interest further indicates a first nonce. The first command can be a SCSI command and can be transmitted to a storage device attached to the target device based on the SCSI protocol.

The first command can be a push of data or a SCSI command that provides some form of an ACK response, as described in relation to FIG. 3. In response to the first interest, the system receives a content object with a payload that includes data received in response to the target device executing the command (or a content object that indicates a NACK) (operation 512). Alternatively, the first command can be a request to pull data, as described in relation to FIG. 4. The system receives a second interest with the first name, wherein the second interest indicates information associated with a second encapsulated protocol data unit (PDU) (operation 514). The second encapsulated PDU indicates a request for data from the initiating device, and the first name is the name of a subsequent interest that the target is to use to request the data from the initiating device. The system generates a first content object that satisfies the second interest and includes a payload with responsive data (operation 516).

Figure 5B:
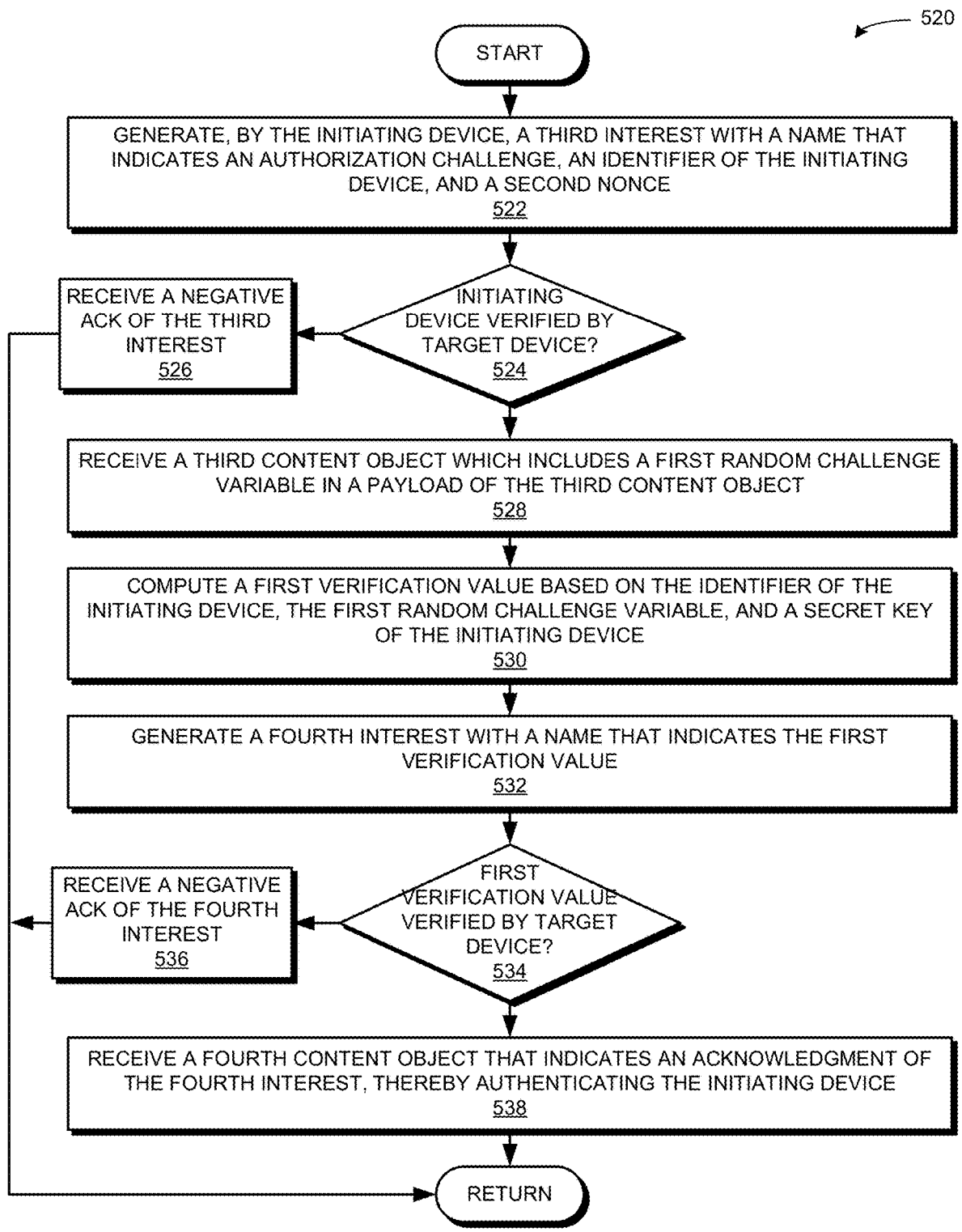
FIG. 5B presents a flow chart illustrating a method by an initiator or a client computing device for authenticating a target device, in accordance with an embodiment of the present invention.

FIG. 5B presents a flow chart 520 illustrating a method by an initiator or a client computing device for authenticating a target device, in accordance with an embodiment of the present invention. During operation, the system generates, by the initiating device, a third interest with a name that indicates an authorization challenge, an identifier of the initiating device, and a second nonce (operation 522). The system determines whether the initiating device is verified by the target device (decision 524). If it is not, the initiating device receives a negative ACK of the third interest (operation 526), and the operation returns.

If the initiating device is verified by the target device, the initiating device receives a third content object which includes a first random challenge variable in a payload of the third content object (operation 528). The initiating device computes a first verification value based on the identifier of the initiating device, the first random challenge variable, and a secret key of the initiating device (operation 530). The system generates a fourth interest with a name that indicates the first verification value (operation 532). The system determines whether the first verification value is verified by the target device (decision 534). If it is not, the initiating device receives a NACK of the fourth interest (operation 536), and the operation returns.

If the first verification value is verified by the target device, the initiating device receives a fourth content object that indicates an ACK of the fourth interest, thereby authenticating the initiating device to the target (operation 538).

Target Device Facilitates SCSI Over CCN

Figure 6A:
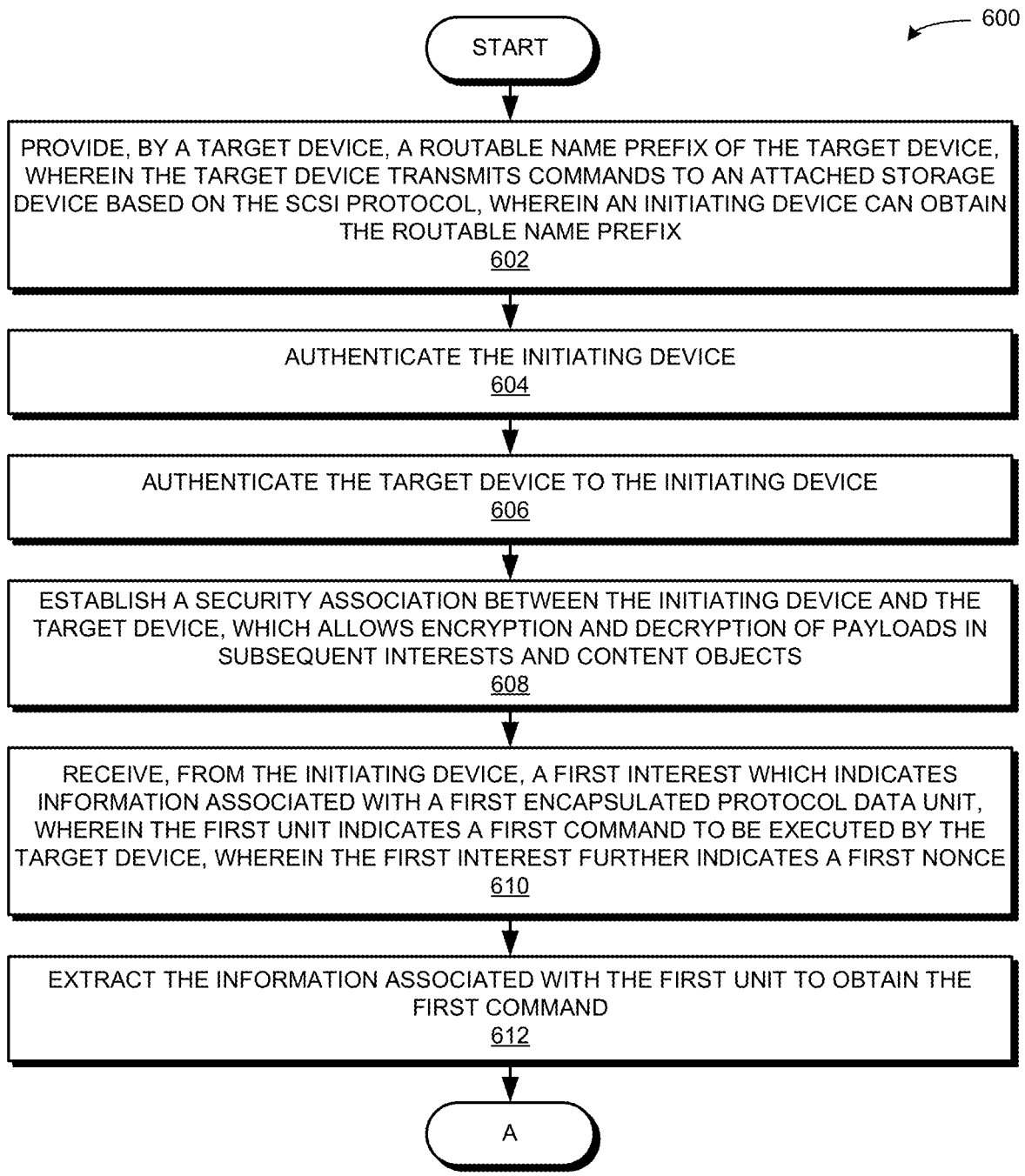
FIG. 6A presents a flow chart illustrating a method by a target or a content producing device for facilitating the implementation of the SCSI protocol over a content centric network, in accordance with an embodiment of the present invention.

FIG. 6A presents a flow chart 600 illustrating a method by a target or a content producing device for facilitating the implementation of the SCSI protocol over a content centric network, in accordance with an embodiment of the present invention. During operation, the system provides, by a target device or a target, a routable name prefix of the target device, wherein the target device transmits commands to an attached storage device based on the SCSI protocol, and wherein an initiating device can obtain the routable name prefix (operation 502). The system authenticates the initiating device (operation 604, as described herein in relation to FIGS. 2A and 6C). The system also authenticates the target device to the initiating device (operation 606, as described herein in relation to FIG. 2B). The system establishes a security association between the initiating device and the target device, which allows encryption and decryption of payloads in subsequent interests and content objects (operation 608). The system receives, from the initiating device, a first interest which indicates information associated with a first encapsulated protocol data unit (PDU) (operation 610). The first encapsulated PDU indicates a first command to be executed by the target device, and the first interest further indicates a first nonce. The first command can be a SCSI command and can be transmitted to a storage device attached to the target device based on the SCSI protocol. The target device extracts the information associated with the first unit to obtain the first command (operation 612). The operation continues as described at Label A of FIG. 6B.

Figure 6B:
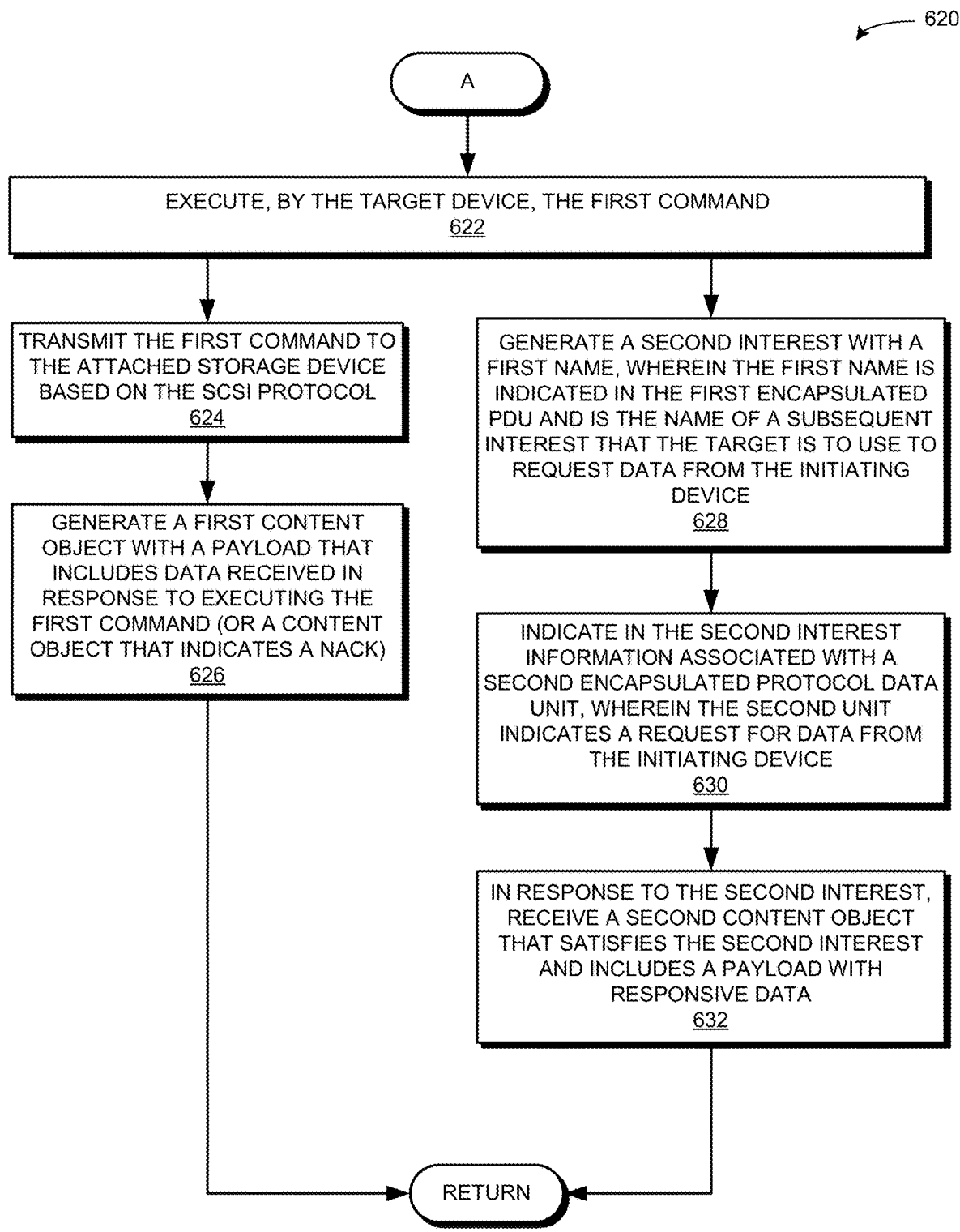
FIG. 6B presents a flow chart illustrating a method by a target or a content producing device for facilitating the implementation of the SCSI protocol over a content centric network, in accordance with an embodiment of the present invention.

FIG. 6B presents a flow chart 620 illustrating a method by a target or a content producing device for facilitating the implementation of the SCSI protocol over a content centric network, in accordance with an embodiment of the present invention. The target device executes the first command (operation 622). The first command can be a push of data or a SCSI command that provides some form of an ACK response, as described in relation to FIG. 3. The system transmits the first command to the attached storage device based on the SCSI protocol (operation 624). The system generates a content object with a payload that includes data received in response to the target device executing the command (or a content object that indicates a NACK) (operation 626). Alternatively, the first command can be a request to pull data, as described in relation to FIG. 4. The target device generates a second interest with a first name, wherein the first name is indicated in the first encapsulated PDU and is the name of a subsequent interest that the target is to use to request data from the initiating device (operation 628). The target device indicates in the second interest information associated with a second encapsulated PDU (operation 630). The second encapsulated PDU indicates a request for data from the initiating device. In response to the second interest, the system receives a second content object that satisfies the second interest and includes a payload with responsive data (operation 632).

Figure 6C:
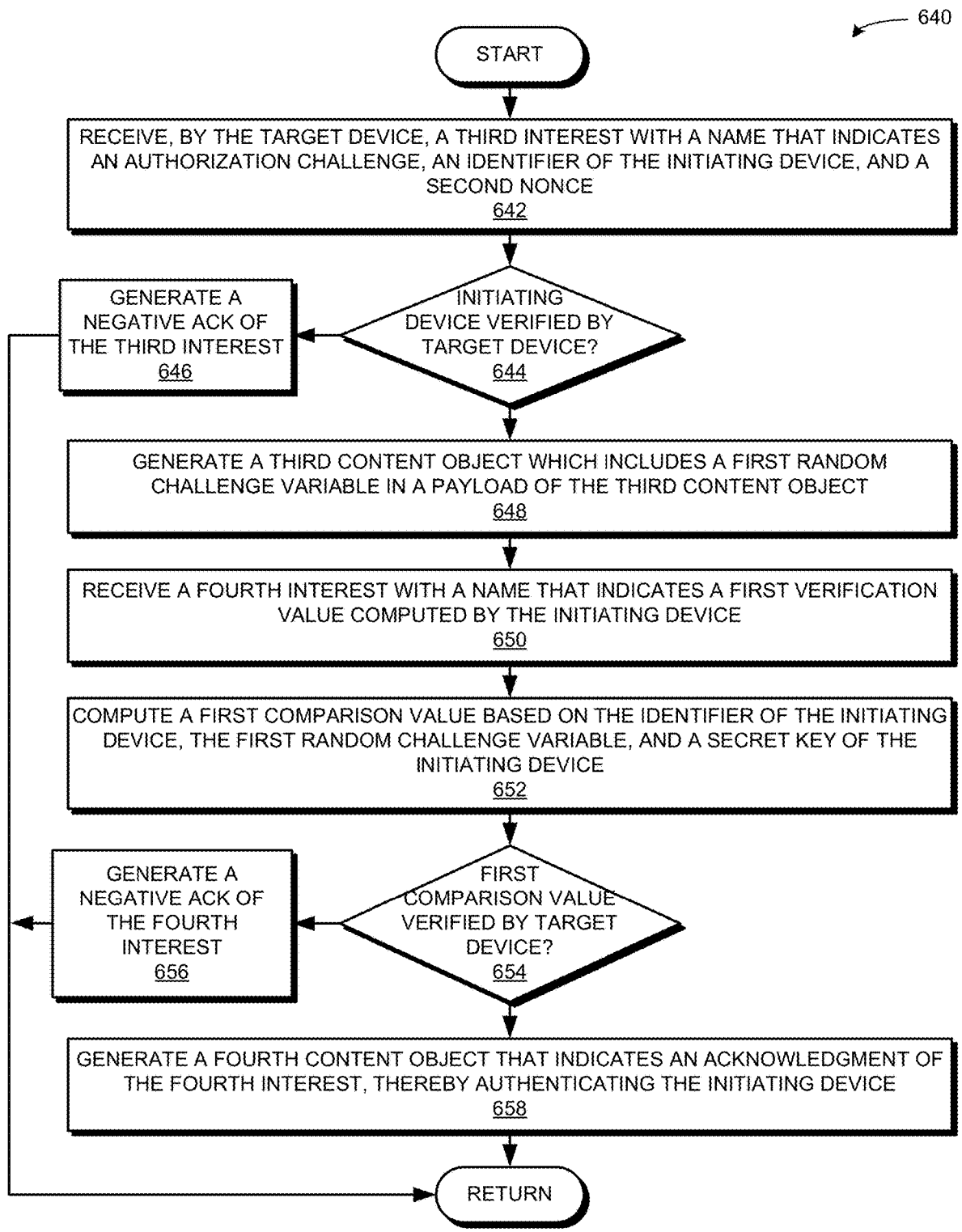
FIG. 6C presents a flow chart illustrating a method by a target or a content producing device for authenticating the target device to an initiating device, in accordance with an embodiment of the present invention.

FIG. 6C presents a flow chart 640 illustrating a method by a target or a content producing device for authenticating the target device to an initiating device, in accordance with an embodiment of the present invention. During operation, the system receives, by the target device, a third interest with a name that indicates an authorization challenge, an identifier of the initiating device, and a second nonce (operation 642). The system determines whether the initiating device is verified by the target device (decision 644). If it is not, the target device generates a NACK of the third interest (operation 646), and the operation returns.

If the initiating device is verified by the target device, the target device generates a third content object which includes a first random challenge variable in a payload of the third content object (operation 648). The target device receives a fourth interest with a name that indicates a first verification value computed by the initiating device (operation 650). The first verification value is computed by the initiating device based on the identifier of the initiating device, the first random challenge variable, and a secret key of the initiating device. The target device computes a first comparison value based on the identifier of the initiating device, the first random challenge variable, and the secret key of the initiating device (operation 652).

The system determines whether the first comparison value is verified by the target device (decision 654). If it is not, the target device generates a NACK of the fourth interest (operation 656), and the operation returns. If the first comparison value is verified by the target device, the target device generates a fourth content object that indicates an ACK of the fourth interest, thereby authenticating the initiating device to the target device (operation 658).

Exemplary Computer System

Figure 7:
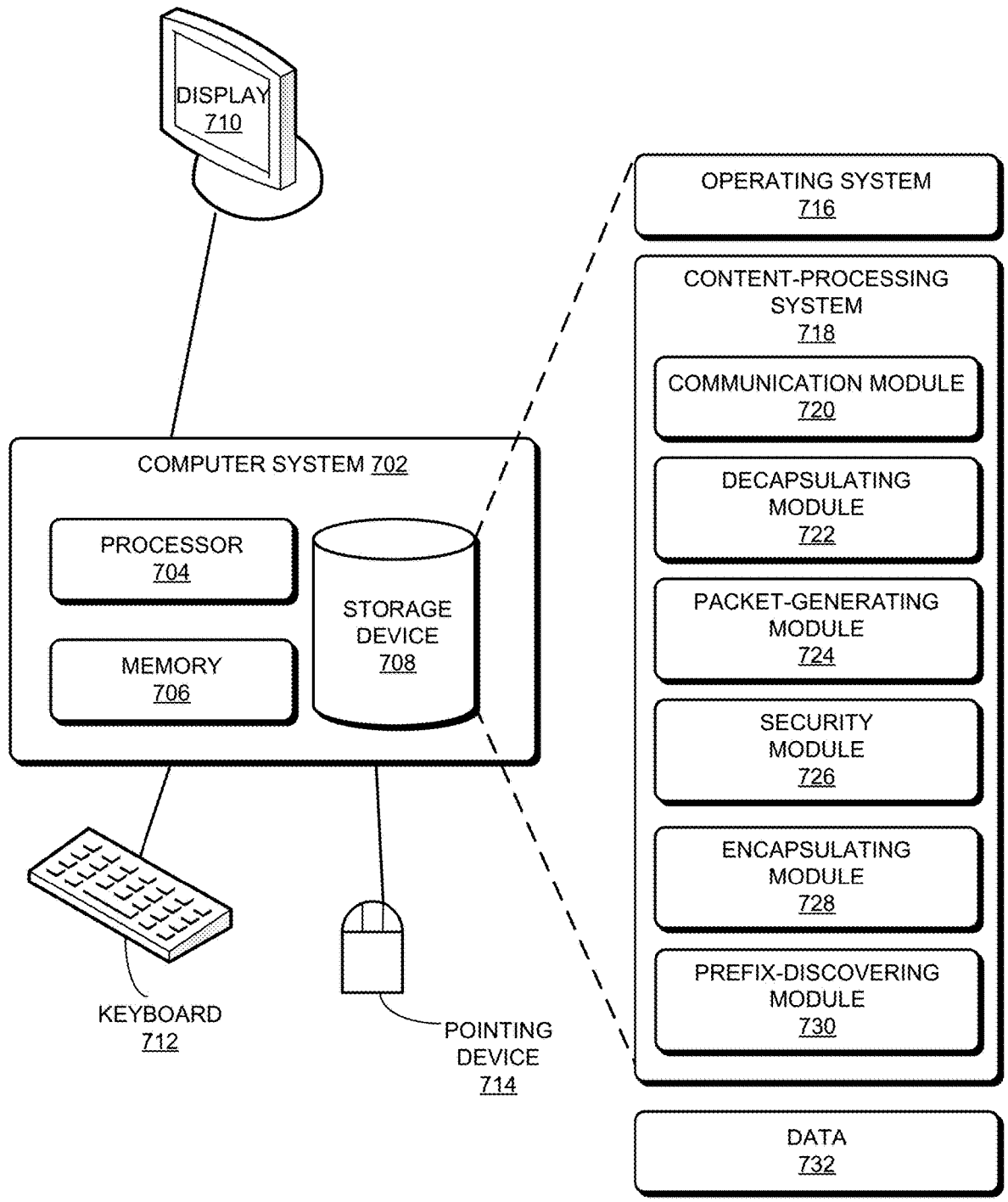
FIG. 7 illustrates an exemplary computer system that facilitates the implementation of the SCSI protocol over a content centric network, in accordance with an embodiment of the present invention.

FIG. 7 illustrates an exemplary computer system 700 that facilitates routable prefix queries in a content centric network, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 732.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, such as a content centric network (communication module 720). A data packet can include an interest packet or a content object packet with a name which is an HSVLI that includes contiguous name components ordered from a most general level to a most specific level. A data packet can also include a command, a SCSI command, SCSI data, a PDU, or an encapsulated PDU.

Furthermore, content-processing system 718 can include instructions for receiving, by a target device, a first interest which indicates a first nonce and information associated with a first encapsulated protocol data unit, wherein the first unit indicates a first command to be executed by the target device (communication module 720). Content-processing system 718 can include instructions for extracting the information associated with the first unit to obtain the first command (decapsulating module 722). Content-processing system 718 can also include instructions for generating a first content object with a payload that includes data received in response to executing the first command (packet-generating module 724).

Content-processing system 718 can additionally include instructions for generating a second interest with the first name, and indicating in the second interest information associated with a second encapsulated protocol data unit, wherein the second unit indicates a request for data from the initiating device (packet-generating module 724). Content-processing system 718 can include instructions for, in response to the second interest, receiving a second content object that satisfies the second interest and includes a payload with responsive data (communication module 720). Content-processing system 718 can also include instructions for authenticating an initiating device to a target device, and authenticating the target device to the initiating device (security module 726).

Content-processing system 718 can further include instructions for generating, by an initiating device, a first interest which indicates a first nonce and information associated with a first encapsulated protocol data unit, wherein the first unit indicates a first command to be executed by a target device (packet-generating module 724). Content-processing system 718 can include instructions for, in response to the first interest, receiving a first content object with a payload that includes data received in response to the target device executing the first command (communication module 720).

Content-processing system 718 can also include instructions for receiving a second interest with the first name, wherein the second interest indicates information associated with a second encapsulated protocol data unit, wherein the second unit indicates a request for data from the initiating device (communication module 720). Content-processing system 718 can include instructions for generating a second content object that satisfies the second interest and includes a payload with responsive data (packet-generating module 724).

Furthermore, content-processing system 718 can include instructions for encapsulating and inserting the first protocol data unit into a payload of the first interest, or encoding the information associated with the first protocol data unit in the name of the first interest (encapsulating module 728). Content-processing system 718 can include instructions for obtaining a routable name prefix of the target device based on one or more of: maintaining a catalog of routable name prefixes of target devices; a manifest published by the target device which lists routable name prefixes for the target device and other target devices under the domain of the target device; and a directory of routable name prefixes for the target device and other target devices, wherein the target device and the other target devices publish their respective routable name prefixes to the directory, wherein the initiating device obtains the routable name prefix from the directory (prefix-discovering module 730).

Data 732 can include any data that is required as input or that is generated as output by the methods and/or processes described in this disclosure. Specifically, data 732 can store at least: an interest; a content object; a nonce; a PDU; an encapsulated PDU; a command; a SCSI command; information associated with a PDU or an encapsulated PDU; a name for an interest or a content object; a name that is an HSVLI; a key; information to implement a SCSI protocol over a CCN; an ACK; a NACK; a request for a target device to pull data from an initiating device based on a name; a payload; an encapsulated PDU in an interest payload; a name with PDU data encoded in the name; a routable name prefix; a catalog, manifest, or directory of routable name prefixes; an authentication challenge; an identifier of an initiating device or a target device; a random challenge variable; a verification value; a comparison value; and information needed for or obtained as a result of a key exchange protocol.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system, comprising:
a processor; and
a storage device storing instructions that when executed by the processor cause the processor to perform a method, the method comprising:
receiving, by a target device from an initiating device, a first interest which includes a name and information associated with a first protocol data unit that indicates a first command, of a small computer system interface protocol, to be executed by the target device to pull data from storage attached to the target device based on a first name, wherein the name includes a name prefix of the target device;
extracting the information to obtain the first command;
generating a first content object with a payload that includes data received in response to executing the first command, thereby facilitating use of the small computer system interface protocol over a content centric network;
generating a second interest with the first name and that indicates a request for the data and, in response to the second interest, receiving a second content object with the data; and
in response to receiving a third interest that includes an identifier of the initiating device and indicates an authentication challenge, authenticating the initiating device to the target device based on the identifier, wherein the authenticating includes generating an acknowledgement indicating results of the authenticating.

2. The computer system of claim 1, wherein the first command is transmitted to the storage based on the small computer system interface protocol.

3. The computer system of claim 1, wherein the first interest indicates the information associated with the first protocol data unit based on:
the first protocol data unit being encapsulated and inserted into a payload of the first interest; or
the information associated with the first protocol data unit being encoded in the name of the first interest.

4. The computer system of claim 1, wherein a routable name prefix of the target device is obtained based on one or more of:
a catalog of routable name prefixes of target devices maintained by the initiating device;
a manifest published by the target device which lists routable name prefixes for the target device and other target devices under a domain of the target device; and
a directory of routable name prefixes for the target device and other target devices, wherein the target device and the other target devices publish their respective routable name prefixes to the directory, which is subsequently obtained and read by the initiating device.

5. The computer system of claim 1, wherein the authenticating further includes:
verifying that the initiating device is permitted to access the storage;
generating a third content object which includes a first random challenge variable in a payload of the third content object;
receiving a fourth interest that indicates a first verification value computed by the initiating device;

computing a first comparison value based on the identifier of the initiating device, the first random challenge variable, and a secret key of the initiating device; and in response to determining that the computed first comparison value matches the first verification value, generating, as the acknowledgement indicating the results of the authenticating, a fourth content object that indicates an acknowledgment of the fourth interest, thereby authenticating the initiating device.

6. The computer system of claim 5, wherein the first verification value is computed by the initiating device based on the identifier of the initiating device, the first random challenge variable, and the secret key of the initiating device, wherein the secret key of the initiating device is previously exchanged with the target device based on a key exchange protocol.

7. The computer system of claim 5, wherein the authenticating further comprises:

in response to determining that the computed first comparison value does not match the first verification value, generating, as the acknowledgement indicating the results of the authenticating, a negative acknowledgment of the fourth interest.

8. The computer system of claim 5, wherein the payload of the third content object further includes an identifier of the target device, wherein a payload of the fourth interest includes a second random challenge variable generated by the initiating device, wherein the method further comprises authenticating the target device, which involves:

computing a second verification value based on the identifier of the target device, the second random challenge variable, and a secret key of the target device;

including the second verification value in a payload of the fourth content object in response to the initiating device successfully verifying the second verification value, receiving an acknowledgment of the fourth content object; and in response to the initiating device unsuccessfully verifying the second verification value, receiving a negative acknowledgment of the fourth content object.

9. The computer system of claim 5, wherein the target device and the initiating device establish a security association based on one or more of:

a key exchange protocol;

a key exchange protocol based on the content centric network; and a Diffie-Hellman key exchange protocol, wherein information needed for a key exchange protocol is included in a payload of an interest or a content object sent or received by the target device.

10. A computer system, comprising:

a processor; and a storage device storing instructions that when executed by the processor cause the processor to perform a method, the method comprising:

generating, by an initiating device, a first interest which includes a name and information associated with a first protocol data unit that indicates a first command, of a small computer system interface protocol, to be executed by a target device to pull data from storage attached to the target device based on a first name, wherein the name includes a name prefix of the target device;

in response to the first interest, receiving a first content object with a payload that includes data received in response to the target device executing the first command, thereby facilitating use of the small computer system interface protocol over a content centric network;

receiving a second interest with the first name and that indicates a request for the data and, in response to the second interest, generating a second content object with the data; and in response to generating a third interest that includes an identifier of the initiating device and indicates an authentication challenge, authenticating the initiating device to the target device based on the identifier, wherein the authenticating includes receiving an acknowledgement indicating results of the authenticating.

11. The computer system of claim 10, wherein the first command is transmitted to the storage based on the small computer system interface protocol.

12. The computer system of claim 10, wherein the first interest indicates the information associated with the first protocol data unit based on:

encapsulating and inserting the first protocol data unit into a payload of the first interest; or encoding the information associated with the first protocol data unit in the name of the first interest.

13. The computer system of claim 10, where the method further comprises obtaining a routable name prefix of the target device based on one or more of:

maintaining a catalog of routable name prefixes of target devices;

a manifest published by the target device which lists routable name prefixes for the target device and other target devices under a domain of the target device; and a directory of routable name prefixes for the target device and other target devices, wherein the target device and the other target devices publish their respective routable name prefixes to the directory, wherein the initiating device obtains the routable name prefix from the directory.

14. The computer system of claim 10, wherein the authenticating further includes:

in response to the target device verifying that the initiating device is permitted to access the, receiving a third content object which includes a first random challenge variable in a payload of the third content object;

computing a first verification value based on the identifier of the initiating device, the first random challenge variable, and a secret key of the initiating device;

generating a fourth interest that indicates the first verification value; and in response to the target device successfully verifying the first verification value, receiving, as the acknowledgement indicating the results of the authenticating, a fourth content object that indicates an acknowledgment of the fourth interest, thereby authenticating the initiating device.

15. The computer system of claim 14, wherein the target device successfully verifying the first verification value involves:

computing, by the target device, a first comparison value based on the identifier of the initiating device, the first random challenge variable, and the secret key of the initiating device; and determining that the computed first comparison value matches the first verification value, wherein the secret key of the initiating device is previously exchanged with the target device based on a key exchange protocol.

16. The computer system of claim 14, wherein the authenticating further comprises:
in response to the target device unsuccessfully verifying the first verification value, receiving, as the acknowledgement indicating the results of the authenticating, a negative acknowledgment of the fourth interest.

17. The computer system of claim 14, wherein the payload of the third content object further includes an identifier of the target device, wherein a payload of the fourth interest includes a second random challenge variable generated by the initiating device, wherein the method further comprises authenticating the target device, which involves:
computing, by the target device, a second verification value based on the identifier of the target device, the second random challenge variable, and a secret key of the target device, wherein the second verification value is included in a payload of the fourth content object;
computing, by the initiating device, a second comparison value based on the identifier of the target device, the second random challenge variable, and the secret key of the target device;
in response to determining that the computed second comparison value matches the second verification value, generating an acknowledgment of the fourth content object; and
in response to determining that the computed second comparison value does not match the second verification value, generating a negative acknowledgment of the fourth content object.

18. The computer system of claim 14, wherein the target device and the initiating device establish a security association based on one or more of:
a key exchange protocol;
a key exchange protocol based on the content centric network; and
a Diffie-Hellman key exchange protocol,
wherein information needed for a key exchange protocol is included in a payload of an interest or a content object sent or received by the target device.

19. A method, comprising:
at a target device including a processor and a storage device, performing:
receiving from an initiating device a first interest which includes a name and information associated with a first protocol data unit that indicates a first command, of a small computer system interface protocol, to be executed by the target device to pull data from storage attached to the target device based on a first name, wherein the name includes a name prefix of the target device;
extracting the information to obtain the first command;
generating a first content object with a payload that includes data received in response to executing the first command, thereby facilitating use of the small computer system interface protocol over a content centric network;
generating a second interest with the first name and that indicates a request for the data and, in response to the second interest, receiving a second content object with the data; and
in response to receiving a third interest that includes an identifier of the initiating device and indicates an authentication challenge, authenticating the initiating device to the target device based on the identifier, wherein the authenticating includes generating an acknowledgement indicating results of the authenticating.

20. The method of claim 19, wherein the first command is transmitted to the storage based on the small computer system interface protocol.

* * * * *